US012756617B2

(12) United States Patent
Zhang et al.

(10) Patent No.: US 12,756,617 B2
(45) Date of Patent: Oct. 6, 2026

(54) GENERATIVE OPERATION PREWARNING BEACON SERVICE

(71) Applicant: SAP SE, Walldorf (DE)

(72) Inventors: Le Zhang, Xi'an (CN); Yu Wang, Xi'an (CN); Moritz Semler, Spechbach (DE); Haoxing Hou, Xi'an (CN); Daping Wang, Xi'an (CN)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 18/775,313

(22) Filed: Jul. 17, 2024

(65) Prior Publication Data

US 2026/0025310 A1 Jan. 22, 2026

(51) Int. Cl.
*H04L 41/06* (2022.01)
*H04L 41/0869* (2022.01)

(52) U.S. Cl.
CPC .......... *H04L 41/06* (2013.01); *H04L 41/0869* (2013.01)

(58) Field of Classification Search
None
See application file for complete search history.

(56) References Cited

U.S. PATENT DOCUMENTS 11,356,318 B2 * 6/2022 Embarmannar Vijayan ................ H04L 41/0686
11,805,005 B2 * 10/2023 Dutta ..................... H04L 41/342
12,212,988 B2 * 1/2025 Masood ................ H04W 24/08
12,541,417 B2 * 2/2026 Bethamsetty ......... G06F 11/079
2014/0189097 A1 * 7/2014 Sidi ....................... H04L 43/045 709/224
2017/0201897 A1 * 7/2017 Yang ....................... H04L 43/16
2017/0353363 A1 * 12/2017 Parker ..................... H04L 43/08
2020/0159998 A1 * 5/2020 Cohavi ................. G06F 40/289
2020/0401936 A1 * 12/2020 Embarmannar Vijayan ................ G06F 11/3452
2021/0006481 A1 * 1/2021 Gao ..................... H04L 41/0681
2022/0391300 A1 * 12/2022 Trapani ............... G06F 11/3409
(Continued)

FOREIGN PATENT DOCUMENTS

DE 102023113680 A1 * 6/2024 ............ H04W 16/18
WO WO-2017012654 A1 * 1/2017 ............ H04W 24/00
(Continued)

*Primary Examiner* — Sandarva Khanal

(74) *Attorney, Agent, or Firm* — Mintz Levin Cohn Ferris Glovsky and Popeo, P.C.

(57) ABSTRACT

Arrangements for a generative operation prewarning beacon service are provided. A series of performance indexes may be monitored. One or more trends may be determined from the series of performance indexes. A first prewarning vector may be generated based on the determined one or more trends. Trending operations associated with the one or more trends may be stored in a data store. A validity check may be performed on content information communicated between upstream and downstream services. A second pre-warning vector may be generated based on a result of the validity check. The first prewarning vector and the second prewarning vector may be transmitted to an anomaly aggregator. The anomaly aggregator may consolidate at least the first prewarning vector and the second prewarning vector into a unified record of operation prewarning vectors. An operation prewarning report may be generated before an actual alert is triggered.

20 Claims, 10 Drawing Sheets

(56) References Cited

U.S. PATENT DOCUMENTS

| | | | | |
|---|---|---|---|---|
| 2024/0001562 | A1 * | 1/2024 | Coca | A47L 11/4066 |
| 2024/0205100 | A1 * | 6/2024 | Richter | H04L 41/06 |

FOREIGN PATENT DOCUMENTS

| | | | | |
|---|---|---|---|---|
| WO | WO-2020231696 A1 * | 11/2020 | | G06N 3/044 |
| WO | WO-2024018257 A1 * | 1/2024 | | H04L 41/0823 |

* cited by examiner

GENERATIVE OPERATION PREWARNING BEACON SERVICE

TECHNICAL FIELD

The subject matter described herein relates generally to data processing and more specifically to a generative operation prewarning beacon service.

BACKGROUND

Monitoring a cloud service for operation anomalies under a traditional approach utilizes a predefined series of alert matrices. A notification is triggered only with pre-defined, manually configured, thresholds. However, for many cloud operation outages or other malfunction situations, such static, pre-defined alerts are insufficient to allow for timely issue identification and remediation. Such traditional pre-defined alerts are usually provided too late or too early (e.g., false positive trigger). Moreover, outages or other breakdown circumstances are oftentimes due to expiration of service content communicated between upstream and downstream services, which result in unknown and hard-to-track issues between service invoking chains. Current performance and service health check APIs do not address this issue.

SUMMARY

Methods, systems, and articles of manufacture, including computer program products, are provided for a generative operation prewarning beacon service. In one aspect, there is provided a system including at least one processor and at least one memory. The at least one memory can store instructions that cause operations when executed by the at least one processor. The operations may include: monitoring a series of performance indexes; determining one or more trends from the series of performance indexes; generating a first prewarning vector based on the determined one or more trends; storing, in a data store, trending operations associated with the one or more trends; performing a validity check on content information communicated between upstream and downstream services; generating a second prewarning vector based on a result of the validity check; transmitting the first prewarning vector and the second prewarning vector to an anomaly aggregator, which consolidates at least the first prewarning vector and the second prewarning vector into a unified record of operation prewarning vectors; and generating an operation prewarning report before an actual alert is triggered.

In some variations, one or more of the features disclosed herein including the following features can optionally be included in any feasible combination. In some variations, the series of performance indexes may include key performance indicators.

In some variations, the series of performance indexes may include cloud resource consumption data associated with microservices.

In some variations, the series of performance indexes may include one or more of: central processing unit consumption, memory occupation, disk usage, network throughput, and queue size.

In some variations, determining the one or more trends from the series of performance indexes may include identifying an anomaly peak point which is located immediately prior to an actual peak point.

In some variations, determining the one or more trends from the series of performance indexes may include performing one or more of: a frequency calculation, a deviation calculation, or a bias-shift calculation.

In some variations, the operations may further include receiving operation prewarning information from a plurality of distributed sensor agents.

In some variations, the validity check may be performed based on a dynamic topology graph of related microservices.

In some variations, performing the validity check may include identifying unmatched information or non-compliance information in extracted metadata.

In some variations, the operations may further include generating a prompt dataset for one or more large language models based on one or more prompting templates associated with one or more microservices; and training one or more large language models based on the prompt dataset.

In some variations, the operations may further include determining the one or more trends and performing the validity check using the one or more large language models.

In another aspect, there is provided a method for a generative operation prewarning beacon service. The method may include: monitoring a series of performance indexes; determining one or more trends from the series of performance indexes; generating a first prewarning vector based on the determined one or more trends; storing, in a data store, trending operations associated with the one or more trends; performing a validity check on content information communicated between upstream and downstream services; generating a second prewarning vector based on a result of the validity check; transmitting the first prewarning vector and the second prewarning vector to an anomaly aggregator, which consolidates at least the first prewarning vector and the second prewarning vector into a unified record of operation prewarning vectors; and generating an operation prewarning report before an actual alert is triggered.

In some variations, one or more of the features disclosed herein including the following features can optionally be included in any feasible combination. In some variations, the series of performance indexes may include key performance indicators.

In some variations, the series of performance indexes may include cloud resource consumption data associated with microservices.

In some variations, the series of performance indexes may include one or more of: central processing unit consumption, memory occupation, disk usage, network throughput, and queue size.

In some variations, determining the one or more trends from the series of performance indexes may include identifying an anomaly peak point which is located immediately prior to an actual peak point.

In some variations, determining one or more trends from the series of performance indexes may include performing one or more of: a frequency calculation, a deviation calculation, or a bias-shift calculation.

In some variations, the method may further include receiving operation prewarning information from a plurality of distributed sensor agents.

In some variations, performing the validity check may include identifying unmatched information or non-compliance information in extracted metadata.

In another aspect, there is provided a computer program product that includes a non-transitory computer readable medium. The non-transitory computer readable medium may store instructions that cause operations when executed by at least one processor. The operations may include: monitoring a series of performance indexes; determining one or more trends from the series of performance indexes; generating a first prewarning vector based on the determined one or more trends; storing, in a data store, trending operations associated with the one or more trends; performing a validity check on content information communicated between upstream and downstream services; generating a second prewarning vector based on a result of the validity check; transmitting the first prewarning vector and the second prewarning vector to an anomaly aggregator, which consolidates at least the first prewarning vector and the second prewarning vector into a unified record of operation prewarning vectors; and generating an operation prewarning report before an actual alert is triggered.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the disclosure provide a technical solution that addresses problems associated with identifying potential service operational risks, for example, in a cloud microservices environment. For example, an advanced prewarning approach discussed herein utilizes the trending of concurrent performance indexes collected before pre-defined alerts are triggered and service content validity detection. Further aspects of the disclosure provide architecture and methods of a highly proactive and generative operation prewarning beacon service on a database-as-a-service platform (e.g., SAP HANA Cloud). Aspects of the disclosure introduce advanced auto-generation and detection features to identify operational performance risks, expirations, or other potential technology vulnerabilities. These features are constructed in the form of prewarning beacon generation for the operation processes on the database-as-a-service platform. Additional aspects of the disclosure may swiftly and efficiently identify hot-spotted, potential service operational risks with respect to cloud performance and validity, which could not be timely detected by traditional pre-defined alert systems. Still further, aspects of the disclosure provide cloud operation proactiveness and the capability of reducing cloud operation risks and costs taking into account service level objectives and service level agreement (SLO/SLA) compliance. These and various other arrangements will be discussed more fully below.

Figure 1A:
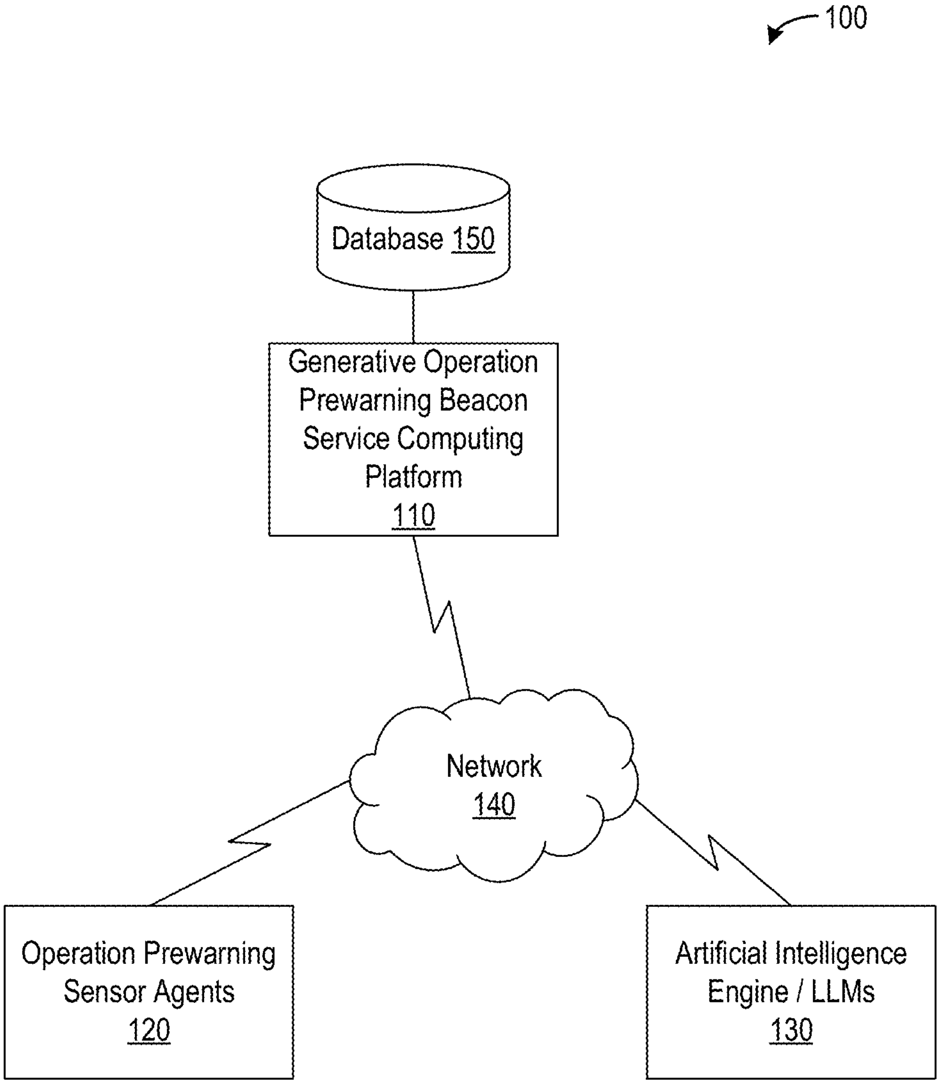
FIG. 1A depicts an illustrative computing environment for a generative operation prewarning beacon service in accordance with some example embodiments.

FIG. 1A depicts an illustrative computing environment 100 for a generative operation prewarning beacon service in accordance with some example embodiments. FIGS. 1B-F depict further details of various components of the generative operation prewarning beacon service in accordance with some example embodiments.

Referring to FIG. 1A, the computing environment 100 may include one or more computing devices and/or other computing systems. For example, computing environment 100 may include a generative operation prewarning beacon service computing platform 110, operation prewarning sensor agents 120, an artificial intelligence engine 130, and a database 150 (e.g., a trending operations repository). Generative operation prewarning beacon service computing platform 110 may include one or more computing devices configured to perform one or more of the functions described herein. For example, generative operation prewarning beacon service computing platform 110 provides advanced ways to timely capture the trending of potential cloud service performance and availability risks in a proactive manner. Distributed flexible operation prewarning sensor agents 120 (distributed sensor agents) may include distributed nodes that monitor and provide edge-computing services. For example, operation prewarning sensor agents 120 (further illustrated in FIG. 1C) may provide localized prewarning generation of sensor information collection process. Artificial intelligence engine 130 may include large language models (LLMs).

Database/trending ops repository 150 may include, for example, a relational database, an in-memory database, a graph database, a key-value store, a document store, and/or the like. In some examples, the generative operation prewarning beacon service computing platform 110 may maintain (e.g., store) various types of data, including static and nonstatic data (e.g., trending operations data, and/or the like) in one or more database tables at a database 150 coupled with the generative operation prewarning beacon service computing platform 110.

Figure 1B:
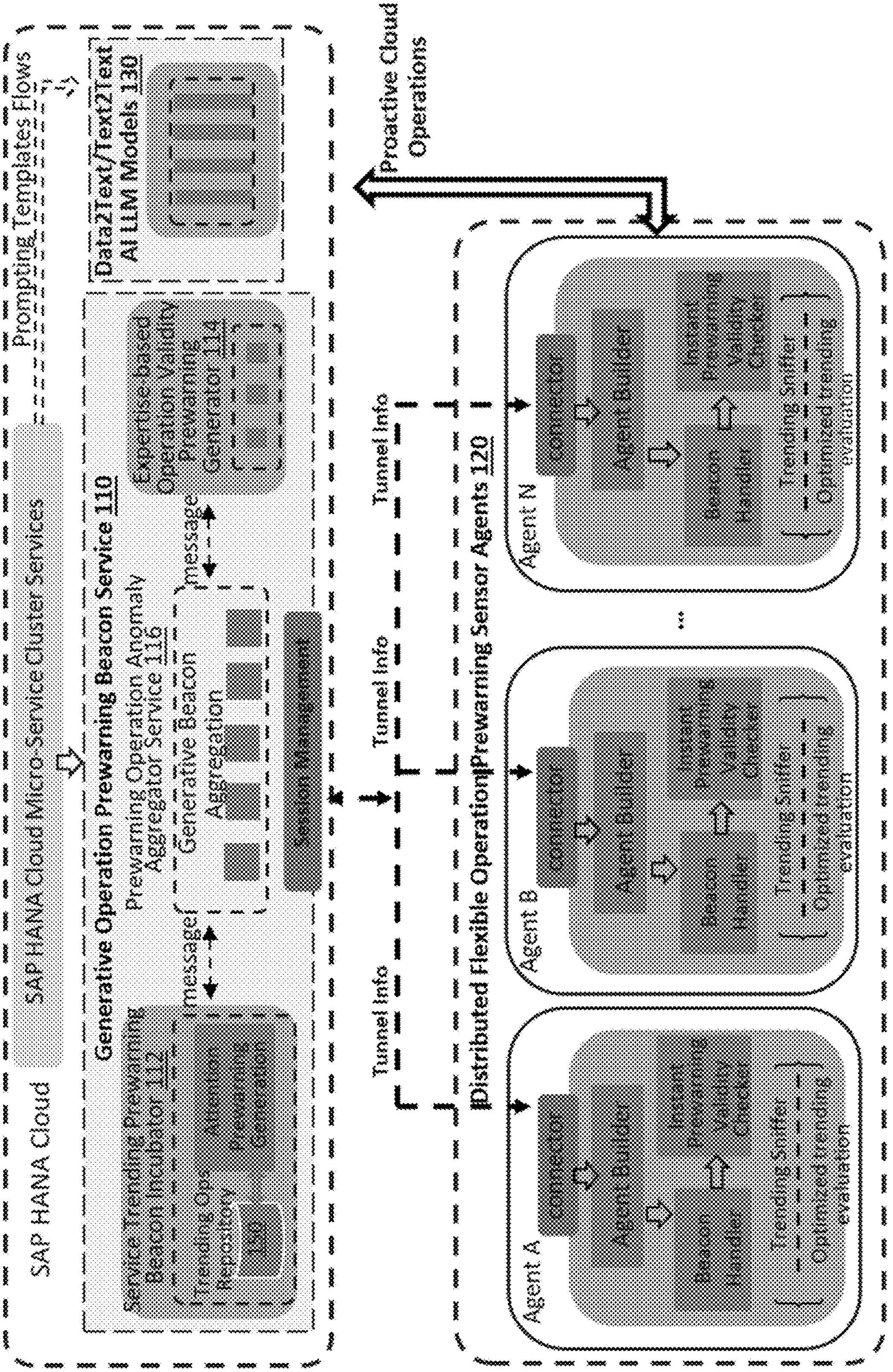
FIGS. 1B-F depict further details of various components of the generative operation prewarning beacon service in accordance with some example embodiments.
Figure 1C:
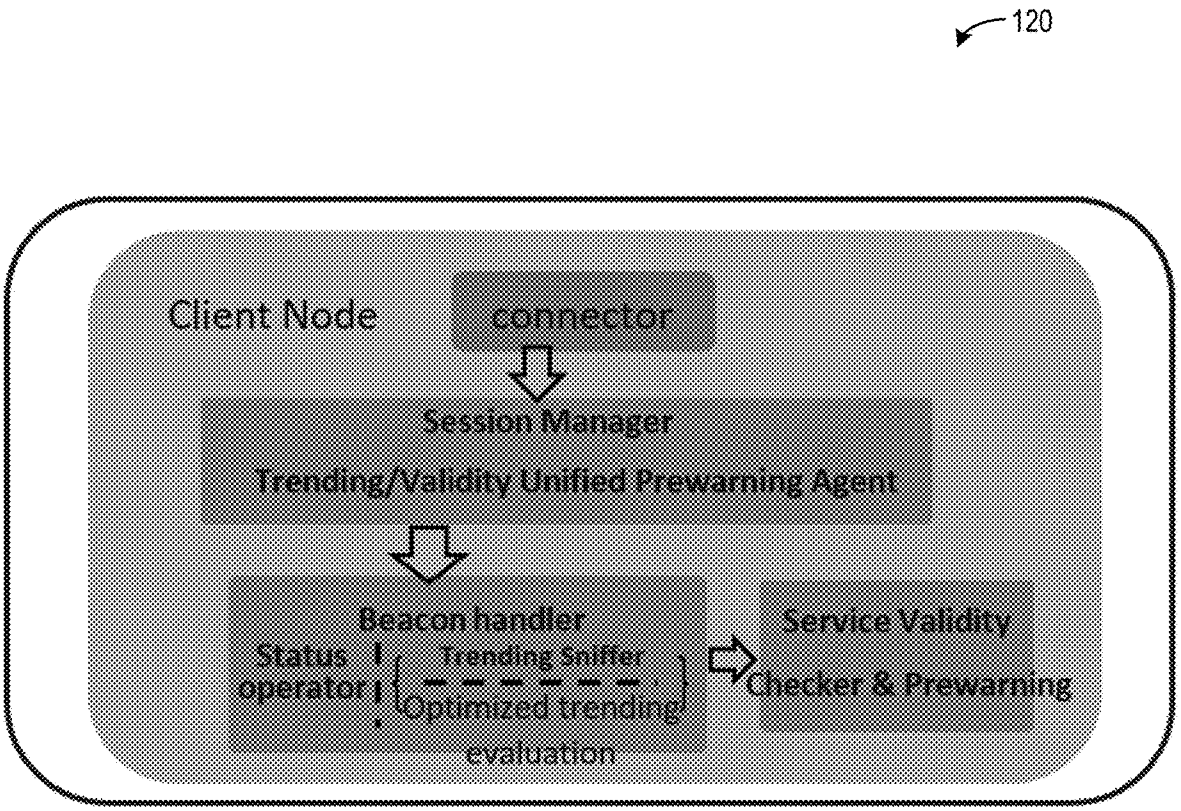
Figure 1D:
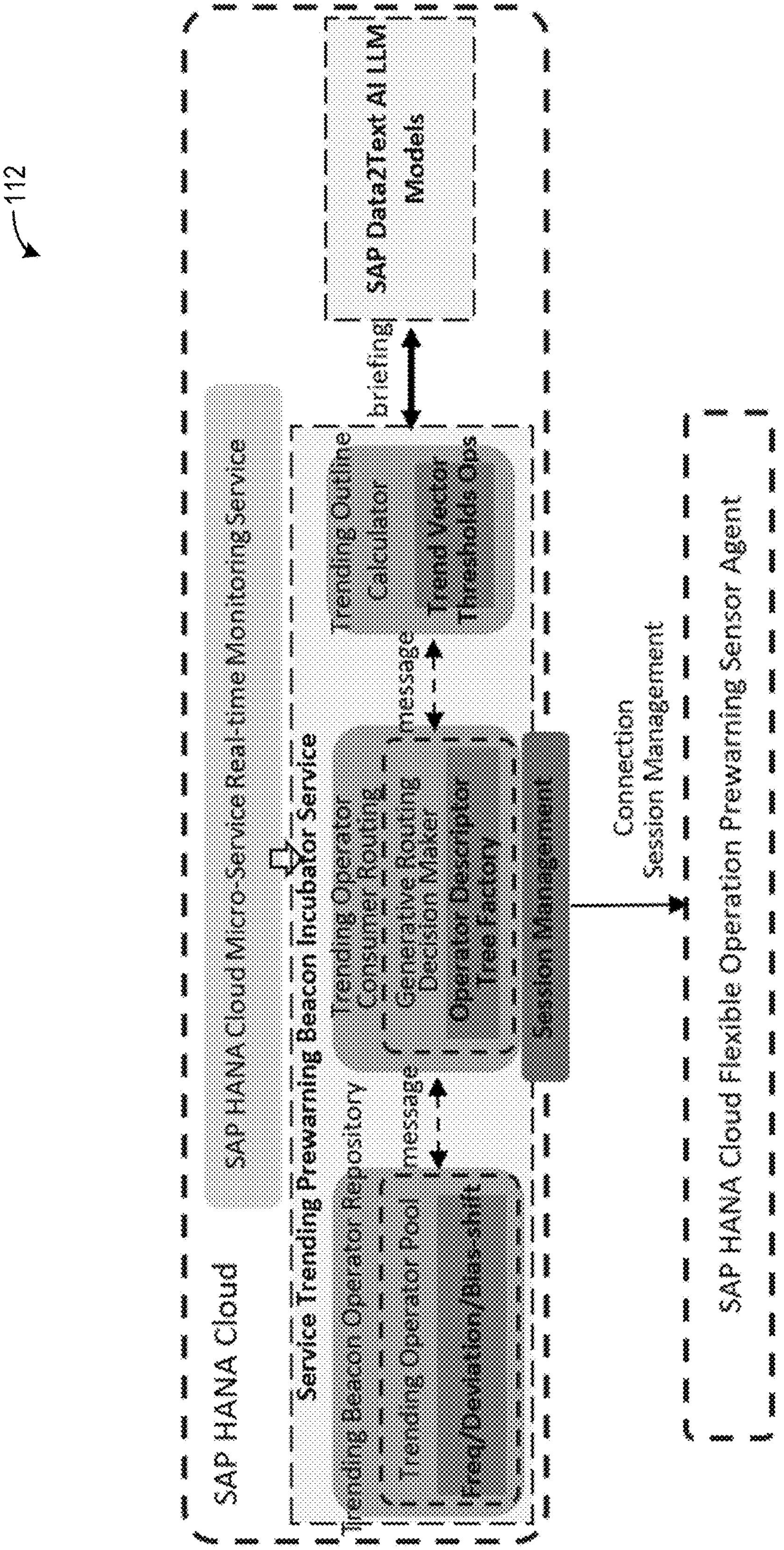
Figure 1E:
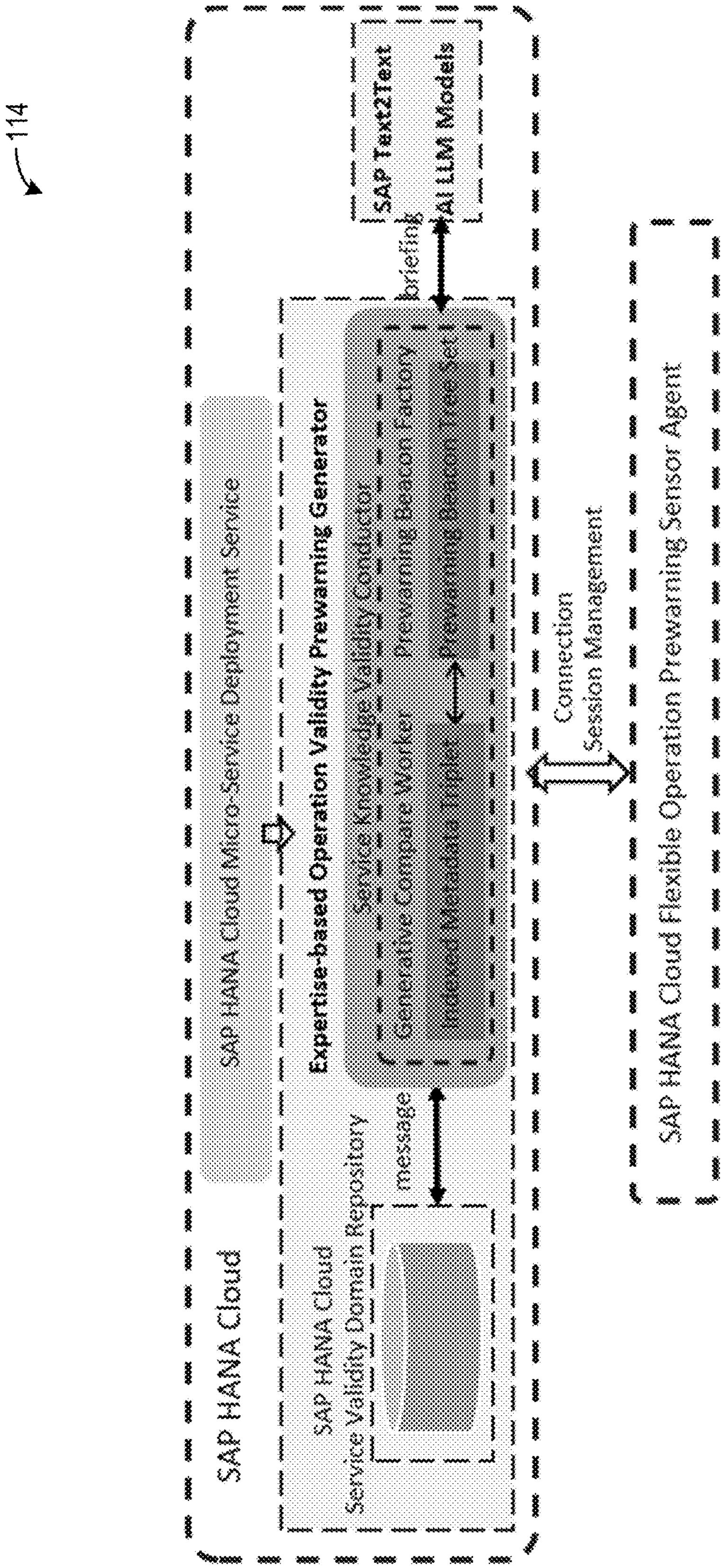
Figure 1F:
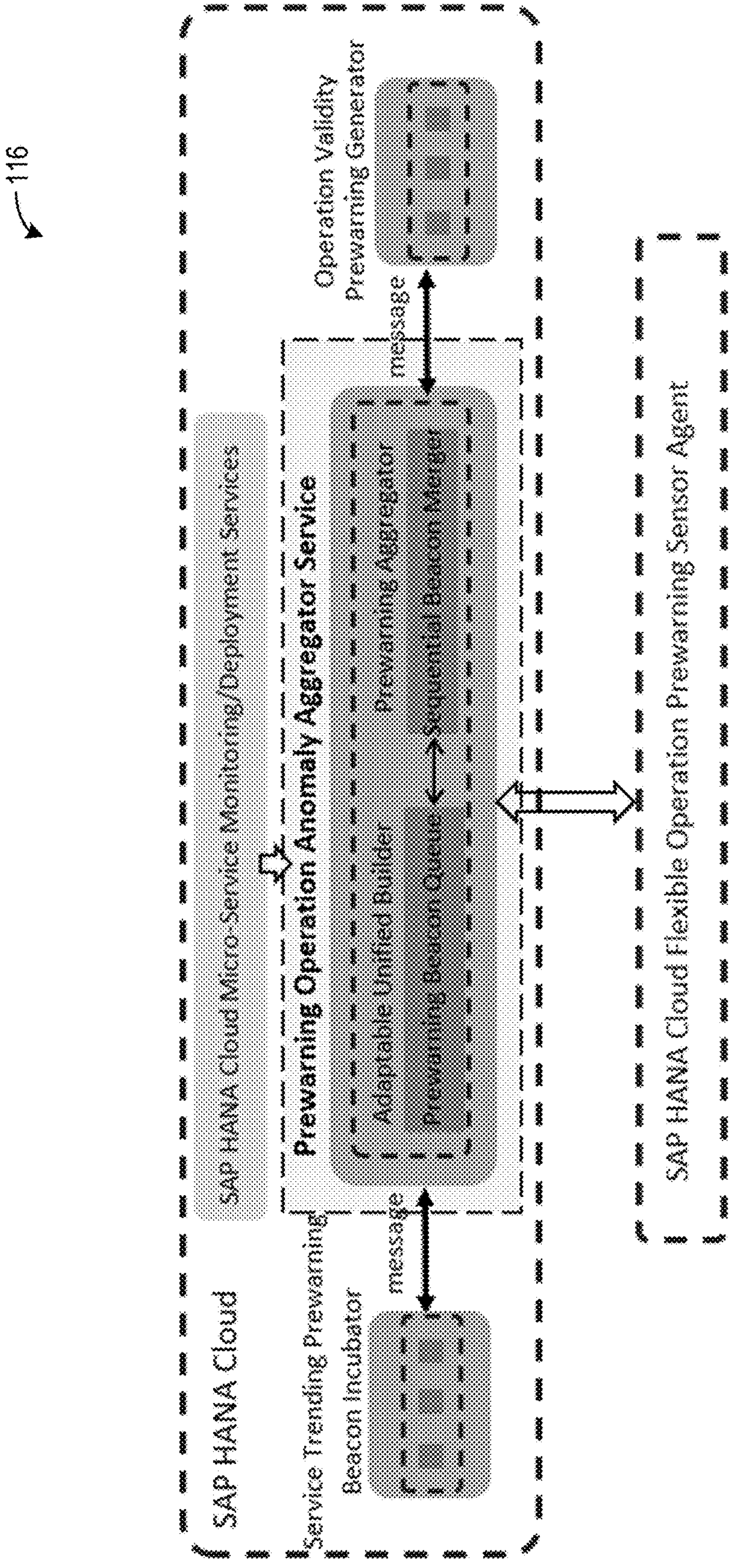

Referring to FIG. 1B, and as discussed in further detail below, generative operation prewarning beacon service computing platform 110 may include a service trending prewarning beacon incubator 112 (further illustrated in FIG. 1D), an expertise-based operation validity prewarning generator 114 (further illustrated in FIG. 1E), and a prewarning operation anomaly aggregator service 116 (further illustrated in FIG. 1F).

Service trending prewarning beacon incubator 112 may detect, predict, and generate prewarning vectors with respect to service performance and health trending analyses. Service trending prewarning beacon incubator 112 may provide automatic, real-time notifications during runtime and before pre-defined alerts are triggered. Service trending prewarning beacon incubator 112 may provide prewarning vectors to downstream prewarning operation anomaly aggregator service 116.

Expertise-based operation validity prewarning generator 114 may collect, compare, and evaluate the validity of service instances deployed in a cloud stack. Expertise-based operation validity prewarning generator 114 provides the capability to extract and compare expertise-based domain-specific service metadata information offered by corresponding cloud service stakeholders. Such service validity health check is advantageous as it receives the related metadata when instance-level deployment is completed in a native cloud context. Expertise-based operation validity prewarning generator 114 may identify unmatched or non-compliance information within extracted cloud service metadata and provide prewarning vectors to downstream prewarning operation anomaly aggregator service 116.

Prewarning operation anomaly aggregator service 116 may consolidate or aggregate information into a primary beacon data structure and evaluate the consumed operation prewarning vectors in a unified formation. For example, prewarning operation anomaly aggregator service 116 may consolidate or aggregate information consumed from service trending prewarning beacon incubator 112 and expertise-based operation validity prewarning generator 114. This information may be consumed in subsequent operation evaluation stages or in further proactive operational actions or notification processes.

Referring again to FIG. 1A, the generative operation prewarning beacon service computing platform 110, the operation prewarning sensor agents 120, the artificial intelligence engine 130, and the database 150 may be communicatively coupled via a network 140. The network 140 may be a wired and/or wireless network including, for example, a wide area network (WAN), local area network (LAN), a virtual local area network (VLAN), the Internet, and/or the like.

Figure 2:
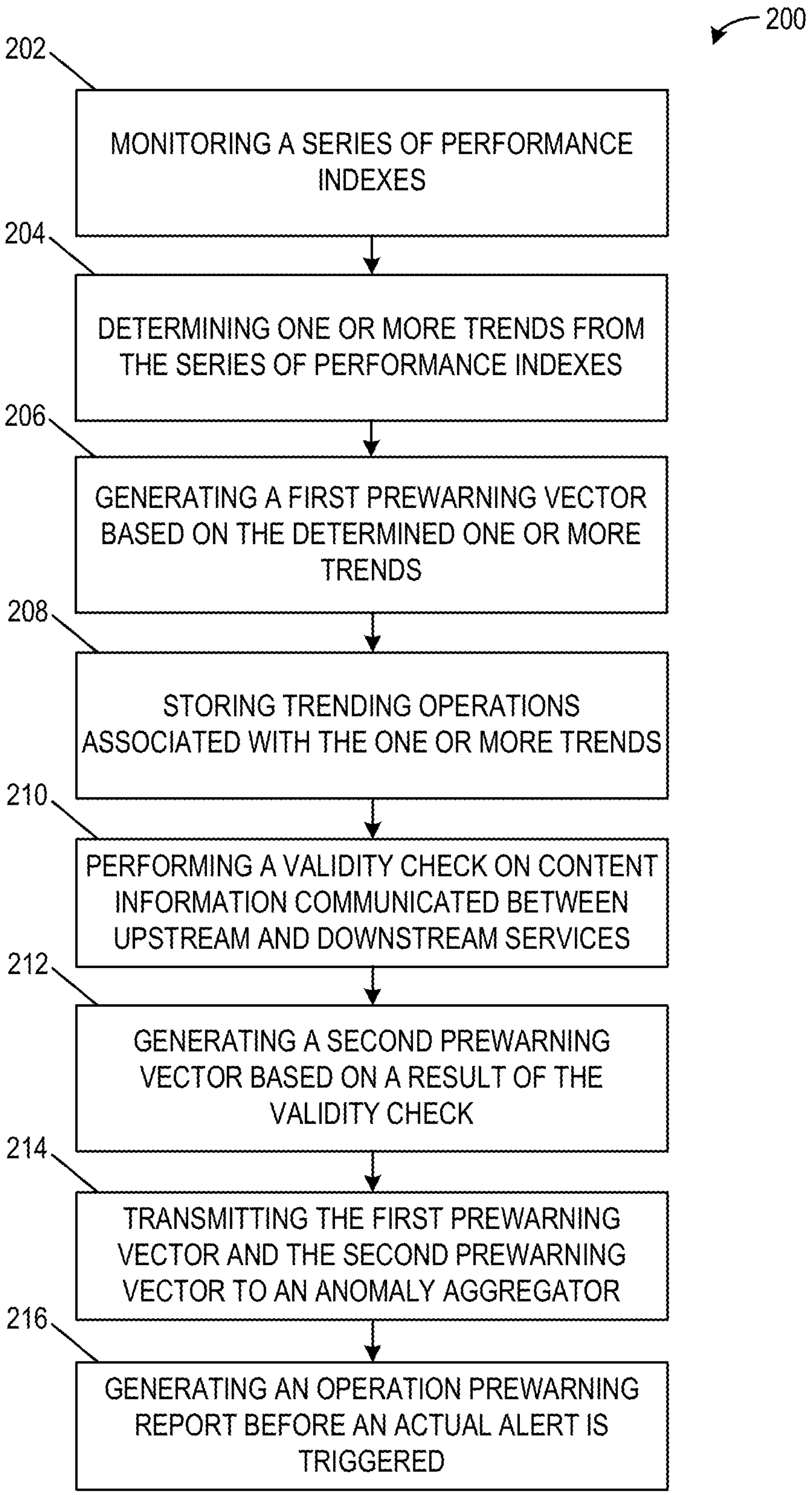
FIG. 2 depicts a flowchart illustrating a process for a generative operation prewarning beacon service in accordance with some example embodiments.
Figure 3:
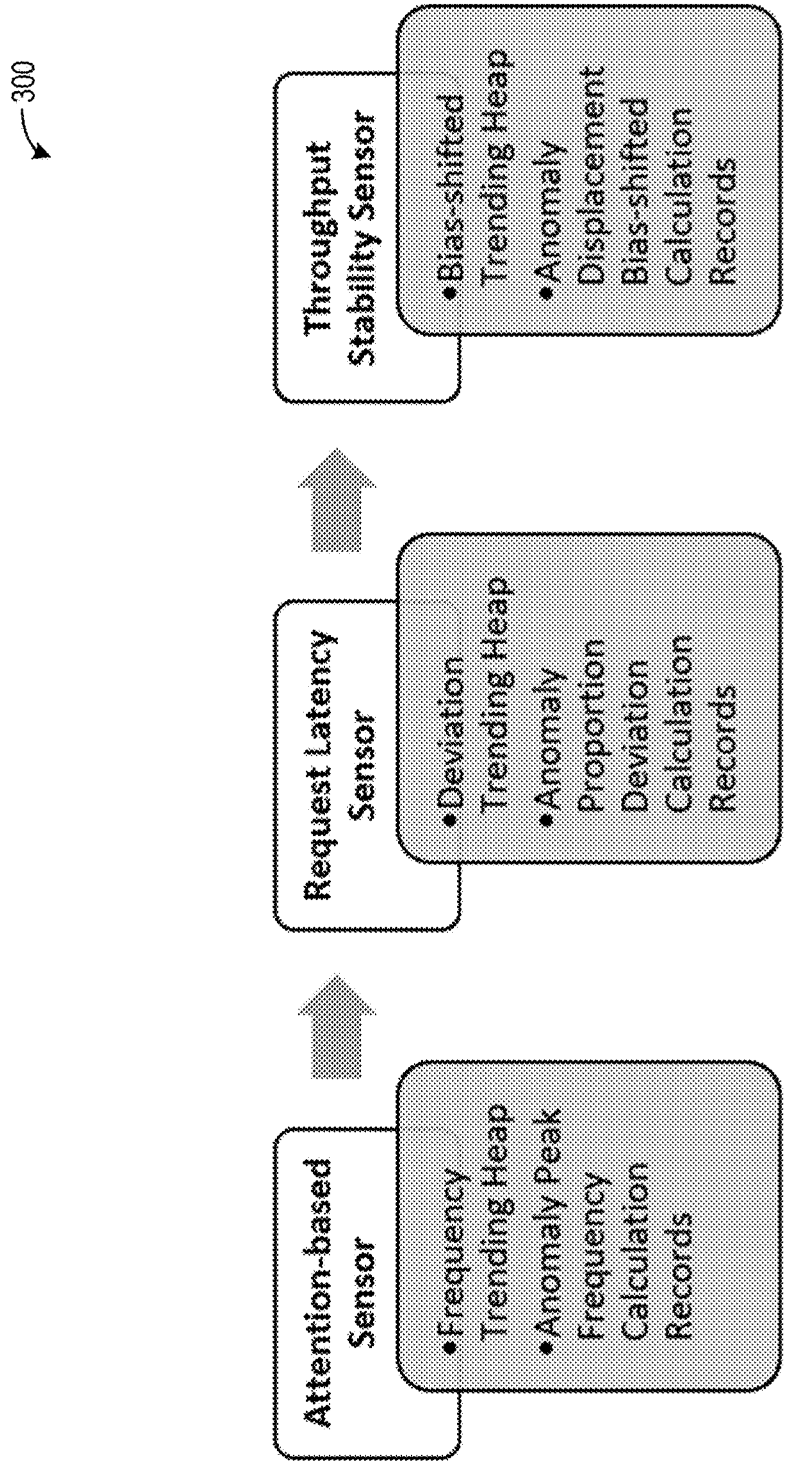
FIG. 3 depicts trending prewarning beacon links in accordance with some example embodiments.
Figure 4:
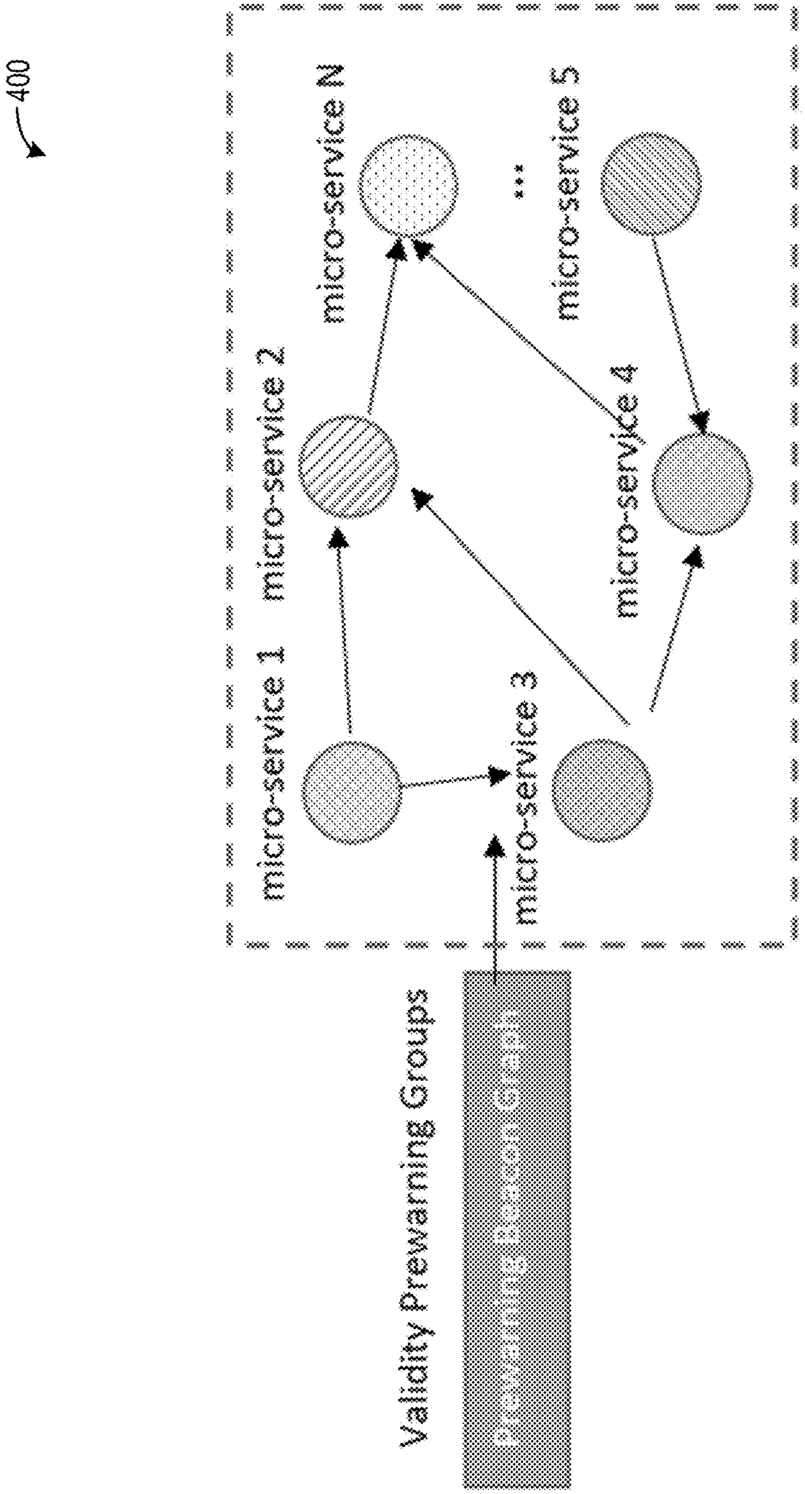
FIG. 4 depicts a prewarning beacon graph associated with the validity prewarning generator in accordance with some example embodiments.

FIGS. 2-4 will be discussed together. FIG. 2 depicts a flowchart 200 illustrating a process for a generative operation prewarning beacon service in accordance with some example embodiments. FIG. 3 depicts trending prewarning beacon links 300 in accordance with some example embodiments. FIG. 4 depicts a prewarning beacon graph 400 associated with the validity prewarning generator in accordance with some example embodiments.

Referring to FIG. 2, at step 202, generative operation prewarning beacon service computing platform 110 may monitor a series of performance indexes (e.g., key performance indicators (KPIs)). In some examples, the series of performance indexes may include cloud resource consumption data associated with microservices. For example, the series of performance indexes may include central processing unit (CPU) consumption, memory occupation, disk usage or availability, cloud network throughput, queue size, and/or the like.

At step 204, generative operation prewarning beacon service computing platform 110 (e.g., via the service trending prewarning beacon incubator 112) may determine one or more trends from the series of performance indexes. In some examples, in determining the one or more trends from the series of performance indexes, generative operation prewarning beacon service computing platform 110 may identify an anomaly peak point located immediately prior to an actual peak point. In some examples, in determining the one or more trends from the series of performance indexes, generative operation prewarning beacon service computing platform 110 may perform one or more of: a frequency calculation, a deviation calculation, or a bias-shift calculation.

In this regard, FIG. 3 illustrates an example data structure for indexing-based trending prewarning beacon links. The data structure is constructed based on real-time cloud operation performance and availability situations when collecting and analyzing corresponding cloud resource consumption data. With intelligent evaluation of service properties and runtime configuration, generative operation prewarning beacon service computing platform 110 may constantly compute an outline of cloud service performance and availability indexes and values with respect to different cloud service sensors. The data structure may record and maintain the various requirements of cloud service operation prewarning including frequency trending calculations, request latency trending calculations, and service throughput stability trending calculations. The related data units are flexibly linked to form the indexing-based trending prewarning beacon links. The associated data may be quickly searched and updated when trending calculations change and could be easily tracked and recorded.

In some implementations, a trending prewarning beacon data structure may be populated with the following trending analysis operators. A frequency trending operator may outline trends of potential risks on frequency vectors. A deviation trending operator may describe trends of ongoing profiles which may imply some undergoing flaws in service logic or behaviors. A bias-shifted trending operator may focus on collective behavior drawbacks in concurrent service instance monitoring values. For example, the bias-shifted trending operator may capture a collective trend of multiple one-service instances and detect uncommon defects from the collective service instances.

Returning to FIG. 2, at step 206, generative operation prewarning beacon service computing platform 110 (e.g., via the service trending prewarning beacon incubator 112) may generate a first prewarning vector based on the determined one or more trends.

At step 208, generative operation prewarning beacon service computing platform 110 (e.g., via database/trending ops repository 150) may store, in a data store, trending operations associated with the one or more trends.

At step 210, generative operation prewarning beacon service computing platform 110 (e.g., via expertise-based operation validity prewarning generator 114) may perform a validity check on content information communicated between upstream and downstream services. For example, generative operation prewarning beacon service computing platform 110 may identify unmatched information or non-compliance information in extracted metadata. For example, during authentication with a Secure Sockets Layer (SSL) certificate, certificate authority (CA) signature owners and related metadata may change, and a downstream cloud service may lack the necessary information for a security compliance check. The service content validity detection at step 210 provides an ongoing validity check to catch up with various cloud service change and release processes. In some examples, the validity check may be performed based on a dynamic topology graph of related microservices as illustrated in FIG. 4.

Referring to FIG. 4, according to the dynamic topology graph of microservices, upstream and downstream services may require expertise-based domain-specific validity metadata to perform comparison and validity checks with respect to SLA/SLO and security compliance checks. For example, microservice 1 may be consumed by microservice 2 and microservice 3, and microservice 2 may be consumed by microservice N, etc. Without integrity checks, there may be negative impacts on the overall system. The illustrated graph provides a data structure and related operations to dynamically update service releases and metadata changes. The graph data structure may introduce domain-specific information into the graph nodes and control workloads when fetching and evaluating the validity of service metadata in an efficient way.

In some implementations, an advanced binary tree search and related operations may be employed. The operation prewarning beacon service may be implemented in the fast-forward approach to quickly update the service validity metadata with required callbacks for possible post actions when a validity prewarning has occurred. The advanced binary tree search and update techniques could leverage a multi-thread pool technique stack to implement instance comparison and check on service validity with respect to a concurrent cloud service instances context.

Returning to FIG. 2, at step 212, generative operation prewarning beacon service computing platform 110 (e.g., via expertise-based operation validity prewarning generator 114) may generate a second prewarning vector based on a result of the validity check.

At step 214, generative operation prewarning beacon service computing platform 110 may transmit the first prewarning vector and the second prewarning vector to an anomaly aggregator. In addition, the anomaly aggregator may consolidate at least the first prewarning vector and the second prewarning vector into a unified record of operation prewarning vectors.

In some implementations, generative operation prewarning beacon service computing platform 110 may receive operation prewarning information from a plurality of distributed sensor agents.

In some implementations, generative operation prewarning beacon service computing platform 110 may generate a prompt dataset for one or more large language models based on one or more prompting templates associated with one or more microservices, and train one or more large language models based on the prompt dataset. In addition, generative operation prewarning beacon service computing platform 110 may determine the one or more trends and perform the validity check using the one or more large language models.

At step 216, generative operation prewarning beacon service computing platform 110 (e.g., via artificial intelligence engine 130) may generate an operation prewarning report before an actual alert is triggered. For example, using Data-to-Text LLM AI-based models, an automatic prewarning briefing report could be generated and consumed in subsequent proactive operation actions.

Advantageously, potential cloud operation risk and issues can be proactively and promptly identified, especially before the triggering of pre-defined alerts. Generative operation prewarning beacon service computing platform 110 may take proactive actions before damage and negative impact due to cloud service outage or breakdown occurs. Instead of reactively waiting for the notification of pre-defined alerts, prewarning analyses will use multiple prewarning operators to deeply explore and detect the potential performance and availability impacts with respect to frequency trending operators, deviation trending operators, bias-shifted trending operators, and/or other calculation operators from various perspectives. When domain-specific thresholds of trending indexes match operational proactive action requests, the related prewarning beacons will be constructed before pre-defined alerts are triggered and before cloud operators or AI-based assistants could identify and receive the related notifications.

Figure 5:
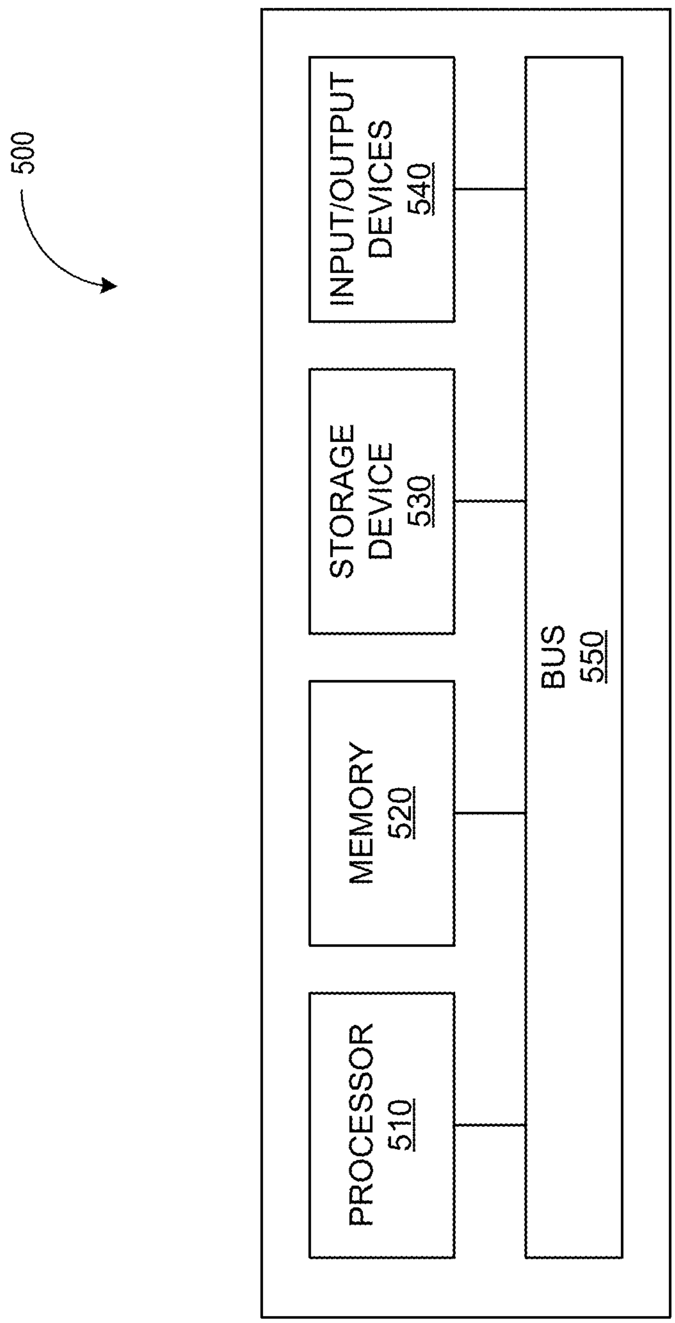
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the generative operation prewarning beacon service computing platform 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the generative operation prewarning beacon service computing platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/ output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
- at least one processor; and
- at least one memory storing instructions, which when executed by the at least one processor, result in operations comprising:
  - monitoring a series of performance indexes;
  - determining one or more trends from the series of performance indexes;
  - generating a first prewarning vector based on the determined one or more trends;
  - storing, in a data store, trending operations associated with the one or more trends;
  - performing a validity check on content information communicated between upstream and downstream services;
  - generating a second prewarning vector based on a result of the validity check;
  - transmitting the first prewarning vector and the second prewarning vector to an anomaly aggregator, wherein the anomaly aggregator consolidates at least the first prewarning vector and the second prewarning vector into a unified record of operation prewarning vectors; and generating an operation prewarning report before an actual alert is triggered.

Example 2: The system of Example 1, wherein the series of performance indexes comprise key performance indicators.

Example 3: The system of any of Examples 1-2, wherein the series of performance indexes comprise cloud resource consumption data associated with microservices.

Example 4: The system of any of Examples 1-3, wherein the series of performance indexes comprise one or more of: central processing unit consumption, memory occupation, disk usage, network throughput, and queue size.

Example 5: The system of any of Examples 1-4, wherein determining the one or more trends from the series of performance indexes comprises identifying an anomaly peak point, wherein the anomaly peak point is located immediately prior to an actual peak point.

Example 6: The system of any of Examples 1-5, wherein determining the one or more trends from the series of performance indexes comprises performing one or more of: a frequency calculation, a deviation calculation, or a bias-shift calculation.

Example 7: The system of any of Examples 1-6, further comprising: receiving operation prewarning information from a plurality of distributed sensor agents.

Example 8: The system of any of Examples 1-7, wherein the validity check is performed based on a dynamic topology graph of related microservices.

Example 9: The system of any of Examples 1-8, wherein performing the validity check comprises identifying unmatched information or non-compliance information in extracted metadata.

Example 10: The system of any of Examples 1-9, further comprising: generating a prompt dataset for one or more large language models based on one or more prompting templates associated with one or more microservices; and training one or more large language models based on the prompt dataset.

Example 11: The system of Example 10, further comprising: determining the one or more trends and performing the validity check using the one or more large language models.

Example 12: A computer-implemented method comprising:
- monitoring a series of performance indexes;
- determining one or more trends from the series of performance indexes;
- generating a first prewarning vector based on the determined one or more trends;
- storing, in a data store, trending operations associated with the one or more trends;
- performing a validity check on content information communicated between upstream and downstream services;
- generating a second prewarning vector based on a result of the validity check;
- transmitting the first prewarning vector and the second prewarning vector to an anomaly aggregator, wherein the anomaly aggregator consolidates at least the first prewarning vector and the second prewarning vector into a unified record of operation prewarning vectors; and generating an operation prewarning report before an actual alert is triggered.

Example 13: The computer-implemented method of Example 12, wherein the series of performance indexes comprise key performance indicators.

Example 14: The computer-implemented method of any of Examples 12-13, wherein the series of performance indexes comprise cloud resource consumption data associated with microservices.

Example 15: The computer-implemented method of any of Examples 12-14, wherein the series of performance indexes comprise one or more of: central processing unit consumption, memory occupation, disk usage, network throughput, and queue size.

Example 16: The computer-implemented method of any of Examples 12-15, wherein determining the one or more trends from the series of performance indexes comprises identifying an anomaly peak point, wherein the anomaly peak point is located immediately prior to an actual peak point.

Example 17: The computer-implemented method of any of Examples 12-16, wherein determining one or more trends from the series of performance indexes comprises performing one or more of: a frequency calculation, a deviation calculation, or a bias-shift calculation.

Example 18: The computer-implemented method of any of Examples 12-17, further comprising: receiving operation prewarning information from a plurality of distributed sensor agents.

Example 19: The computer-implemented method of any of Examples 12-18, wherein performing the validity check comprises identifying unmatched information or non-compliance information in extracted metadata.

Example 20: A non-transitory computer-readable medium storing instructions, which when executed by at least one processor, result in operations comprising:

monitoring a series of performance indexes;

determining one or more trends from the series of performance indexes;

generating a first prewarning vector based on the determined one or more trends;

storing, in a data store, trending operations associated with the one or more trends;

performing a validity check on content information communicated between upstream and downstream services;

generating a second prewarning vector based on a result of the validity check;

transmitting the first prewarning vector and the second prewarning vector to an anomaly aggregator, wherein the anomaly aggregator consolidates at least the first prewarning vector and the second prewarning vector into a unified record of operation prewarning vectors; and generating an operation prewarning report before an actual alert is triggered.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system for identifying potential operation anomalies in a cloud services environment through a generative operation prewarning beacon service, the system comprising:

at least one processor; and at least one memory storing instructions, which when executed by the at least one processor, result in operations comprising:

monitoring a series of performance indexes;
determining one or more trends from the series of performance indexes;
generating a first prewarning vector based on the determined one or more trends;
storing, in a data store, trending operations associated with the one or more trends;
performing a validity check on content information communicated between upstream and downstream services;
generating a second prewarning vector based on a result of the validity check;
transmitting the first prewarning vector and the second prewarning vector to an anomaly aggregator, wherein the anomaly aggregator consolidates at least the first prewarning vector and the second prewarning vector into a unified record of operation prewarning vectors; and
generating an operation prewarning report before an actual alert is triggered.

2. The system of claim 1, wherein the series of performance indexes comprise key performance indicators.

3. The system of claim 1, wherein the series of performance indexes comprise cloud resource consumption data associated with microservices.

4. The system of claim 1, wherein the series of performance indexes comprise one or more of: central processing unit consumption, memory occupation, disk usage, network throughput, and queue size.

5. The system of claim 1, wherein determining the one or more trends from the series of performance indexes comprises identifying an anomaly peak point, wherein the anomaly peak point is located immediately prior to an actual peak point.

6. The system of claim 1, wherein determining the one or more trends from the series of performance indexes comprises performing one or more of: a frequency calculation, a deviation calculation, or a bias-shift calculation.

7. The system of claim 1, further comprising:
receiving operation prewarning information from a plurality of distributed sensor agents.

8. The system of claim 1, wherein the validity check is performed based on a dynamic topology graph of related microservices.

9. The system of claim 1, wherein performing the validity check comprises identifying unmatched information or non-compliance information in extracted metadata.

10. The system of claim 1, further comprising:
generating a prompt dataset for one or more large language models based on one or more prompting templates associated with one or more microservices; and
training one or more large language models based on the prompt dataset.

11. The system of claim 10, further comprising:
determining the one or more trends and performing the validity check using the one or more large language models.

12. A computer-implemented method for identifying potential operation anomalies in a cloud services environment through a generative operation prewarning beacon service, the computer-implemented method comprising:
monitoring a series of performance indexes;
determining one or more trends from the series of performance indexes;
generating a first prewarning vector based on the determined one or more trends;
storing, in a data store, trending operations associated with the one or more trends;
performing a validity check on content information communicated between upstream and downstream services;
generating a second prewarning vector based on a result of the validity check;
transmitting the first prewarning vector and the second prewarning vector to an anomaly aggregator, wherein the anomaly aggregator consolidates at least the first prewarning vector and the second prewarning vector into a unified record of operation prewarning vectors; and
generating an operation prewarning report before an actual alert is triggered.

13. The computer-implemented method of claim 12, wherein the series of performance indexes comprise key performance indicators.

14. The computer-implemented method of claim 12, wherein the series of performance indexes comprise cloud resource consumption data associated with microservices.

15. The computer-implemented method of claim 12, wherein the series of performance indexes comprise one or more of: central processing unit consumption, memory occupation, disk usage, network throughput, and queue size.

16. The computer-implemented method of claim 12, wherein determining the one or more trends from the series of performance indexes comprises identifying an anomaly peak point, wherein the anomaly peak point is located immediately prior to an actual peak point.

17. The computer-implemented method of claim 12, wherein determining one or more trends from the series of performance indexes comprises performing one or more of: a frequency calculation, a deviation calculation, or a bias-shift calculation.

18. The computer-implemented method of claim 12, further comprising:
receiving operation prewarning information from a plurality of distributed sensor agents.

19. The computer-implemented method of claim 12, wherein performing the validity check comprises identifying unmatched information or non-compliance information in extracted metadata.

20. A non-transitory computer readable medium storing instructions, which when executed by at least one processor, result in operations for identifying potential operation anomalies in a cloud services environment through a generative operation prewarning beacon service, the operations comprising:
monitoring a series of performance indexes;
determining one or more trends from the series of performance indexes;
generating a first prewarning vector based on the determined one or more trends;
storing, in a data store, trending operations associated with the one or more trends;
performing a validity check on content information communicated between upstream and downstream services;
generating a second prewarning vector based on a result of the validity check;
transmitting the first prewarning vector and the second prewarning vector to an anomaly aggregator, wherein the anomaly aggregator consolidates at least the first prewarning vector and the second prewarning vector into a unified record of operation prewarning vectors; and generating an operation prewarning report before an actual alert is triggered.

* * * * *